(12) United States Patent
Hayakawa

(10) Patent No.: US 7,977,916 B2
(45) Date of Patent: Jul. 12, 2011

(54) BATTERY PACK

(75) Inventor: Masahiko Hayakawa, Fukushima (JP)

(73) Assignee: Sony Corporation, Tokyo (JP)

( * ) Notice: Subject to any disclaimer, the term of this patent is extended or adjusted under 35 U.S.C. 154(b) by 799 days.

(21) Appl. No.: 12/042,038

(22) Filed: Mar. 4, 2008

(65) Prior Publication Data

US 2008/0224662 A1    Sep. 18, 2008

(30) Foreign Application Priority Data

Mar. 12, 2007  (JP) ................. 2007-061879

(51) Int. Cl.
*H02J 7/00* (2006.01)
*H02J 7/04* (2006.01)

(52) U.S. Cl. ......... 320/134; 320/112; 320/132; 320/162

(58) Field of Classification Search ................... 320/132
See application file for complete search history.

(56) References Cited

U.S. PATENT DOCUMENTS
2005/0057220 A1 *  3/2005  Miwa et al. ................... 320/116

FOREIGN PATENT DOCUMENTS
JP  2002-078222  3/2002
JP  2003-125540  4/2003

* cited by examiner

*Primary Examiner* — Edward Tso
*Assistant Examiner* — Johali A Torres Ruiz
(74) *Attorney, Agent, or Firm* — K&L Gates LLP

(57) ABSTRACT

A battery pack includes a secondary cell, a selection unit, a judging unit, an elapsed time period comparing unit, and a control unit. The selection unit selects either a first operation state or a second operation state. The control unit controls the selection unit to switch from the first operation state to the second operation state when the elapsed time period is longer than a predetermined time period. The control unit also controls the selection unit to switch from a second operation state to a first operation state either (a) when judged as being in an used state by the judging unit while the second operation is selected (b) when a voltage of the second cell becomes equal to or less than a second voltage threshold value which is smaller than a first voltage threshold value while the second operation state is selected.

9 Claims, 4 Drawing Sheets

F I G. 2 A
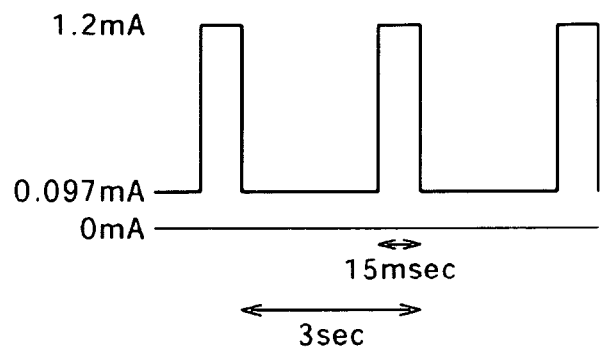
F I G. 2 B
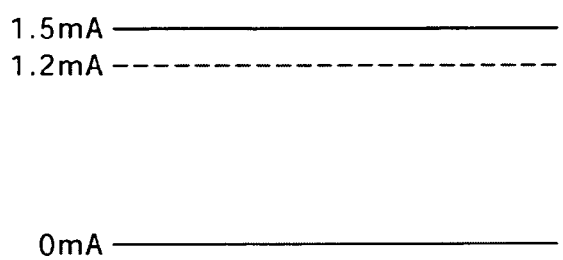
F I G. 3
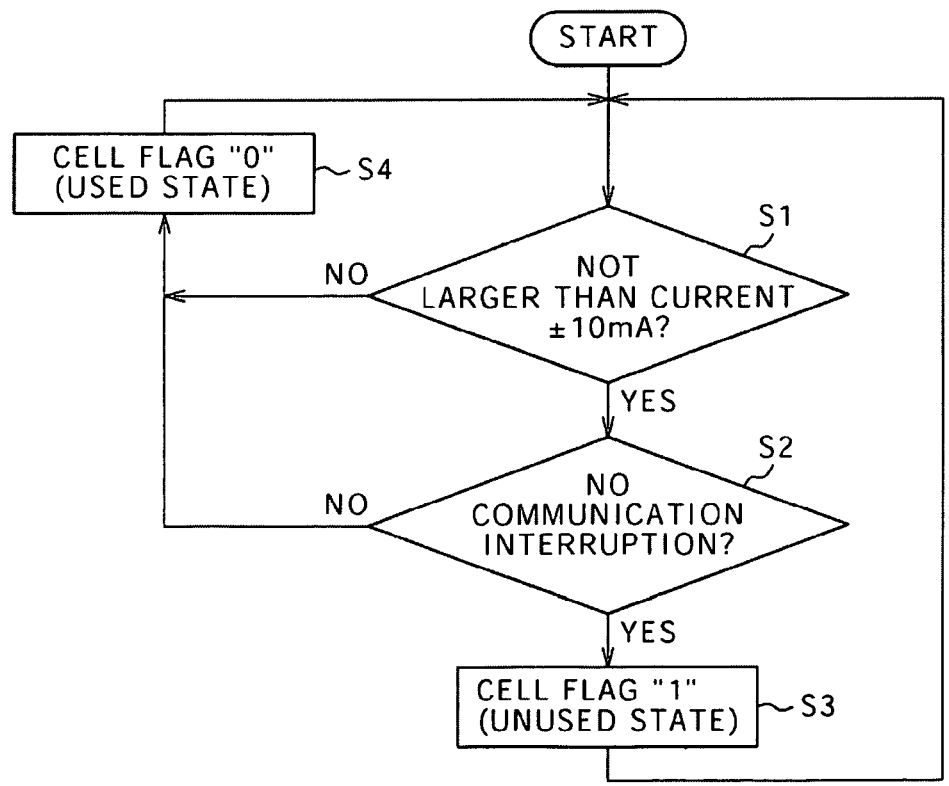

BATTERY PACK

CROSS REFERENCES TO RELATED APPLICATIONS

The present application claims priority to Japanese Patent Application No. 2007-061879 filed in the Japanese Patent Office on Mar. 12, 2007, the entire content of which is incorporated herein by reference.

BACKGROUND

The present invention relates to a battery pack including, for example application, a lithium-ion secondary cell.

A secondary cell, for example, a lithium-ion secondary cell is compact size and light weight, and has a high energy density, high outputs, or the like. Accordingly, a secondary cell is widely used as a power source of application equipments such as a digital camera, a mobile phone, a portable PC, and a camcorder (abbreviation of camera and recorder). The lithium-ion secondary cell is used by repeating discharging and charging, but if the cell is left in the full charged state or at nearly full charged state, cell performance tends to be lowered and life of the cell tends to be shortened. Especially, left conditions, such as under high temperature and for long hours, conspires to make the degradation of the secondary cell prominent.

For example, if charging and discharging are repeated in a manner that first, lithium-ion secondary cells are charged at 4.1V or 4.2V respectively, and then left for predetermined hours under the high voltage state, and thereafter discharged down to 3.0V, the discharge capacity of one lithium-ion secondary cell left at 4.1V is not so lowered even if 300 cycles are exceeded. In contrast to this, the discharge capacity of the other lithium-ion secondary cell left at 4.2V begins to decrease when 200 cycles are exceeded, and the discharge capacity is decreased abruptly when 250 cycles are exceeded. Thus, if a battery pack having a secondary cell, especially a lithium-ion secondary cell, is left for long hours in a high cell voltage state, degradation speed of a cell may be fast.

In view of the features, a technology for performing charging by changing full charge voltage of a cell by a switch, and selectively using a high capacity mode of high set voltage and a long-life mode of set voltage lower compared to that of the high capacity mode, is disclosed in Japanese Unexamined Patent Application Publication No. 2002-78222 (hereinafter referred to as "Patent Document 1").

Further, Japanese Unexamined Patent Application Publication No. 2003-125540 (hereinafter referred to as "Patent Document 2") discloses that the protection function control means of a battery pack monitors the terminal voltage of a secondary cell, and when overcharging is detected, warning is displayed to flow self-consumption current, whereby the voltage of the secondary cell is lowered to the safe voltage area in an early stage.

However, as to the technology disclosed in the Patent Document 1, a user is required to set either the high capacity mode or the long-life mode before charging a secondary cell. Therefore, once the cell is charged in the high capacity mode and left at high voltage state, there is no means for lowering the voltage. Further, uneasy to handle situations, such as a case where a user forgets to switch due to carelessness, are conceivable.

Also, equipments, such as a digital camera and a camcorder, which are not always carried and used by a user, tends to be unused for a relatively long time from when the equipments are used to subsequent time the equipments are used. For example, general users have a few opportunities to use camcorders, or the like everyday. On the other hand, when these equipments are used, a secondary cell tends to be charged at night, which is one day before the equipments are used, or even in the case of travel abroad, mountain climbing, and the like, the equipments tend to be used within one week after the cells are charged. Thus, while charging and discharging of the cells are repeated at relatively short time periods of cycles, the cells of the equipments tend to be left in an unused state for a long time. During the unused time periods, voltages of the secondary cells are left at substantially same state with voltages of last use. Although voltage state of a secondary cell during unused time varies depending on a use method by a user, if cells are left at high voltage state after last use, it is probable that the cells are left at high voltage state for a long time, such as several months or one year, which results in further deterioration of the secondary cells.

Further, in a battery pack, an overcharge detection voltage value in which a protection circuit functions as overcharge protection is set to be higher than a full charge voltage value of a secondary cell by around 0.1V per a single secondary cell (hereinafter referred to as "single cell"). Therefore, even if a voltage value exceeds the full charge voltage value, a protection circuit does not function until the voltage value becomes equal to or larger than the overcharge detection voltage value. Thus, the voltage of a secondary cell may be charged up to a voltage value in a range from equal to or larger than full charge voltage to equal to or less than overcharge detection voltage value. Furthermore, a secondary cell is further deteriorated if the cell is left at such high voltage state. The battery pack described in the Patent Document 2 may not solve an issue that a cell is charged up to a relatively high voltage and left at the high voltage state.

SUMMARY

Accordingly, it is desirable to provide a battery pack which can prevent a secondary, cell from being left at high voltage state and avoid deterioration of the secondary cell.

In accordance with an embodiment, there is provided a battery pack which includes a secondary cell, a selection unit, a judging unit, an elapsed time period comparing unit, and a control unit for controlling the selection unit based on a comparison output from the elapsed time period comparing unit. The selection unit selects either a first operation state having a first power consumption or a second operation state having a second power consumption larger than the first power consumption. The judging unit judges whether the secondary cell is in a used state or an unused state. The elapsed time period comparing unit compares an elapsed time period with a predetermined time period wherein the elapsed time period is a time period over which a voltage of the secondary cell is not less than a first voltage threshold value and the secondary cell is in the unused state. The control unit controls the selection unit to switch from the first operation state to the second operation state when the elapsed time period is longer than the predetermined time period. The control unit controls the selection unit to switch from the second operation state to the first operation state either (a) when judged as being in the used state by the judging unit while the second operation is selected, or (b) when the voltage of the secondary cell becomes equal to or less than a second voltage threshold value which is smaller than the first voltage threshold value while the second operation is selected.

According to an embodiment, a battery pack shifts to an operation state pith a large consumption power when an elapsed time period of an unused state of the battery pack is longer than a predetermined time period, so that a degradation of a secondary cell can be prevented.

Additional features and advantages are described herein, and will be apparent from the following Detailed Description and the figures.

BRIEF DESCRIPTION OF THE FIGURES

FIG. 2 is a graph showing current values of a normal mode and a degradation control mode of a battery pack in an embodiment;

FIG. 3 is a flowchart showing the processing for confirming whether a cell is in a used state or an unused state in an embodiment;

DETAILED DESCRIPTION

Figure 1:
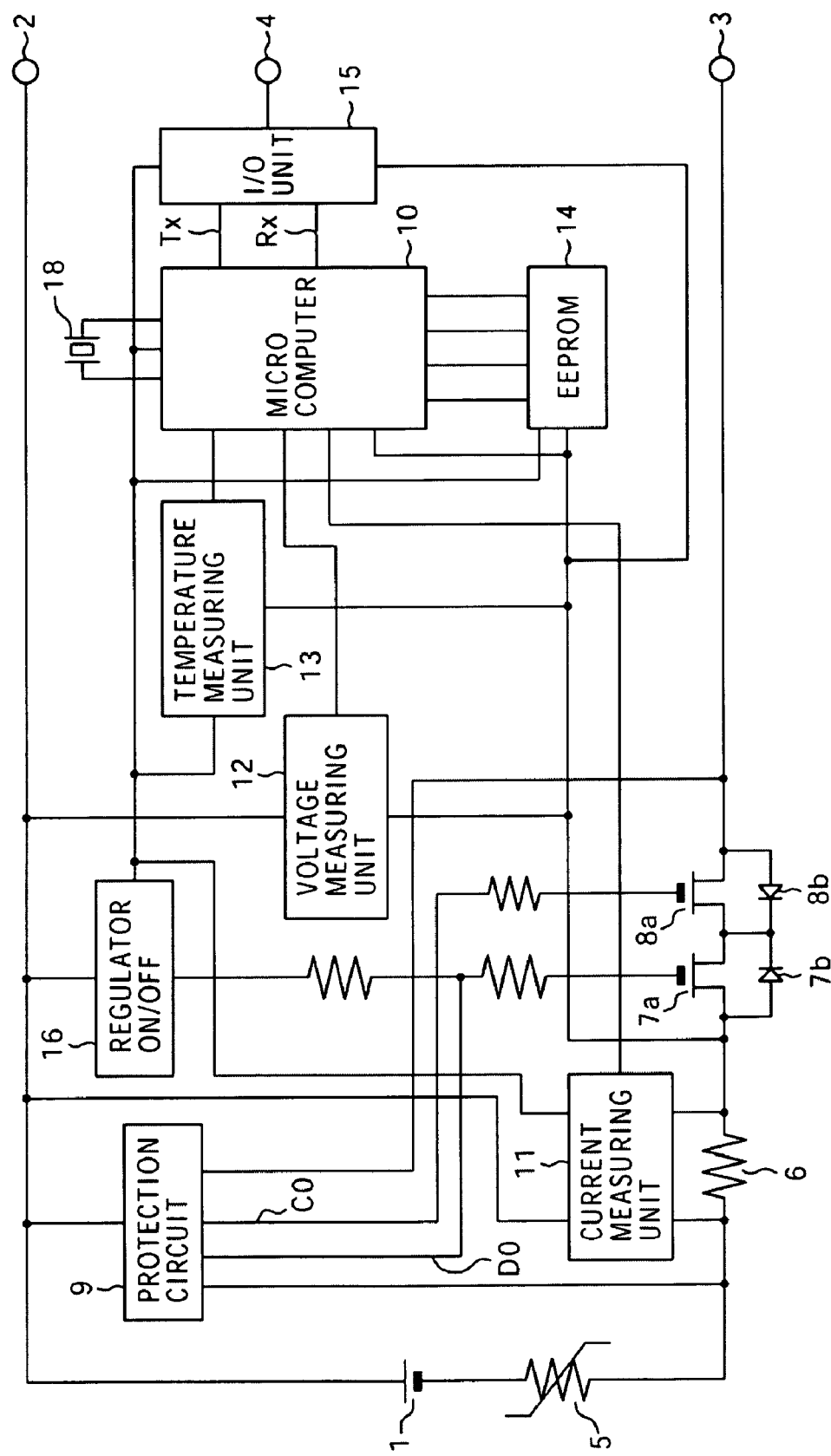
FIG. 1 is a block diagram showing a battery pack according to an embodiment.

Embodiments will be described below with reference to drawings. FIG. 1 shows a battery pack according to an embodiment. The battery pack mainly includes a secondary cell 1, a microcomputer 10 as a processor, a current measuring unit 11, a voltage measuring unit 12, a temperature measuring unit 13, a protection circuit 9, and a regulator 16. When the battery pack is charged, the pack is mounted to a main body of an electronic equipment, AC adaptor, and the like. A plus terminal 2 connected to a positive electrode side of the secondary, cell 1 and a minus terminal 3 connected to a negative electrode side of the secondary cell 1 are respectively connected to a plus terminal and a minus terminal of a charging apparatus to perform charging. Also, when an electronic equipment is used, as similar with the case of the charging, the plus terminal 2 and the minus terminal 3 are respectively connected to a plus terminal and a minus terminal of an electronic equipment to perform discharging.

As the secondary cell 1, a lithium-ion cell of 4.2V full charge voltage per single cell, for example, is used. The number of the secondary cell 1 is not limited to one, and single cells may be connected in series and/or parallel.

The current measuring unit 11 measures magnitude and direction of current by using a current detection resistance 6. The voltage measuring unit 12 is composed by integrated circuit (IC), for example, to measure a voltage of the secondary cell 1. If a plurality of the secondary cell 1 are provided, voltages may be measured per each single cell. The temperature measuring unit 13 is composed of a temperature detection element, such as thermistor to monitor temperature of the secondary cell 1. Thus measured results are supplied to the microcomputer 10. The microcomputer 10 converts the measured result to digital data by A/D converter, and computes a residual capacity of the battery pack by using the measured result. As described later, when the operation state of the microcomputer 10 is in a high-speed mode, processing such as A/D conversion or computation of residual capacitor is performed.

A current limit element 5, the current detection resistance 6, a drain-source of discharging control field effect transistor (discharging control FET) 7a, and a drain-source of charging control FET 8a are inserted in series in power line at negative side which connects a negative electrode of the secondary cell 1 and the minus terminal 3. The current limit element 5 is, for example, positive temperature coefficient (PTC), and as temperature rises, resistance value is increased to limit the current. A parasitic diode 7b and 8b respectively exist in the drain-source of the discharging control FET 7a and charging control FET 8a. The parasitic diode 7b has a polarity in which a direction of the diode is forward along direction of the charging current flowing from the plus terminal 2 to the secondary cell 1, and reverse against direction of discharging current. The parasitic diode 8b has a polarity in which a direction of the diode is reverse against direction of the charging current and forward along direction of the discharging current.

Control signals D0 and C0 are respectively supplied to each gate of the discharging control FET 7a and the charging control FET 8a from the protection circuit 9. In normal charge and discharge operations, the control signals D0 and C0 are at high level, and the discharging control FET 7a and the charging control FET 8a are at ON state. It is noted that the discharging control FET 7a and the charging control FET 8a are N channel type, and therefore, they become ON state by a gate potential which is equal to or higher than a source potential by predetermined values.

The protection circuit 9 supplies the control signal D0 and C0 to the discharging control FET 7a and the charging control FET 8a, and controls ON or OFF of the discharging control FET 7a and the charging control FET 8a to control charging and discharging of the secondary cell 1. The protection circuit 9 has protection functions to protect the secondary cell 1 from overcharging, overdischarging, and over-current. The protection functions will be described below briefly.

Functions for protecting a cell from overcharging will be described first. As charging of the secondary cell 1 proceeds, a cell voltage keeps rising even if the cell is fully charged, and this may leads to an overcharge state involving a potentially dangerous situation. Therefore, it is required that charging is performed at constant current and constant voltage, and a charge control voltage is equal to or lower than a cell rating (for example, 4.2V). However, there may be an overcharging by breakdown of a charger, use of an improper charger, and the like. When the cell is overcharged and the cell voltage is detected to be not less than a certain voltage value, the high level output C0 of the protection circuit 9 becomes low level, the charging control FET 8a becomes OFF state, and whereby charging current is cut off. These are overcharge protection functions. If the FET 8a becomes OFF state, only discharging becomes available by the discharging control FET 7a and the parasitic diode 8b.

Functions for protecting a cell from overdischarging will be described below. If a cell is discharged down to equal to or less than rating of discharge cut-off voltage, for example, and if the cell voltage becomes overdischarge state, which is around 2V to 1.5V or less, the cell may be disabled. The cell discharged until the cell voltage becomes equal to or less than a certain voltage value causes the high level output D0 of the protection circuit 9 becomes low level, the discharging control FET 7a to become OFF state, and whereby discharging current is cut off. These are overcharge protection functions. When the discharging FET 7a becomes OFF state, only charging becomes possible through the charging control FET 8a and the parasitic diode 7b.

Functions for protecting a cell from over-current will be described below. If a between the plus and minus terminals of a cell is short-circuited, large magnitude of current flows, and an abnormal heating may be caused. When discharging current flows not less than a certain current value, the high level output D0 of the protection circuit 9 becomes low level, the discharging control FET 7a becomes OFF state, and whereby the discharging current is cut off. These are over-current protection functions.

Although not shown in the figure, the discharging control FET 7a may be connected to the power line at the negative side, and the charging control FET 8a may be connected to the power line at positive side. A source of the charging control FET 8a is connected to the plus terminal 2 of a power supply and a drain of the FET is connected to a positive electrode of the secondary cell 1. The parasitic diode 8b has a polarity in which a direction of the diode is reverse against the direction of the charging current. The P channel type charging control FET 8a which becomes ON state by a gate voltage being equal to or lower than predetermined values with respect to a source is used. Further, both of the discharging control FET 7a and the charging control FET 8a may be inserted in power line at positive side.

The regulator 16 generates a predetermined voltage, such as 2.5 V voltage stabilized from a voltage of the secondary cell 1. The voltage generated by the regulator 16 is supplied to the microcomputer 10, the current measuring unit 11, the temperature measuring unit 13, an EEPROM 14, and an I/O unit 15, as a power supply voltage.

The control signal D0 which is outputted from the protection circuit 9 and supplied to a gate of the discharging control FET 7a is supplied to the regulator 16 to control ON/OFF thereof. When a potentially overdischarging is detected, the control signal D0 causes the discharging control FET 7a to become OFF state, and accordingly the regulator 16 becomes OFF state. When the regulator 16 becomes OFF state, output voltage of the regulator 16 becomes zero (0). As a result, circuits of which the output voltage of the regulator 16 is a source voltage, such as the microcomputer 10, operation of the circuits is stopped, and consequently, the second cell 1 is prevented from being an overdischarge state due to circuits in the battery pack.

A communication terminal 4 is used to receive commands from a microcomputer provided in an external electronic equipment and send information regarding residual capacity of the second cell 1 when the battery pack is attached to external electronic equipments, such as a camcorder. The received and sent signals are subject to time-division multiplexing and then transmitted via one signal line connected to the communication terminal 4. The I/O unit 15 is provided between the microcomputer 10 and the communication terminal 4 to separate a sending signal Tx and a receiving signal Rx, and adjust levels of the signals. Separate terminals may be provided for sending and receiving.

Values measured by the current measuring unit 11, the voltage measuring unit 12, and the temperature measuring unit 13 are inputted to the microcomputer 10. The measured values and data required to detect residual capacity of the secondary cell 1, such as table showing the relation between a cell voltage and a residual capacity, and detected residual capacity information are stored on the Electrically Erasable and Programmable Read Only Memoir (EEPROM) 14. A data input line, a data output line, a clock supply line, and a chip select supply line are arranged between the microcomputer 10 and the EEPROM 14. As a nonvolatile memory, Random Access Memory (RAM) or the like which include backup power source may be employed other than the EEPROM 14.

The microcomputer 10 computes residual capacity information of the secondary cell 1 by using current measurement values, voltage measurement values, and temperature measurement values. Methods for detecting residual capacity of the secondary cell 1 include a voltage method by which residual capacity of the secondary cell is detected through measurement of the cell voltage, and an accumulation method by which residual capacity of the secondary cell is detected through measurement of voltages and currents, and accumulation of them.

According to a residual capacity detection by the voltage method, terminal voltage of the secondary cell 1 is measured, and thereafter the residual capacity is computed based on correlation between the voltage of the secondary cell and the cell capacity (residual capacity rate). Therefore, in the case of lithium-ion cell, cell voltage of 4.2V/cell is judged as full charged state, and if lowered to 2.4V/cell, the cell is judged as overdischarge state. In this manner, measurement can be made easily.

A residual capacity detection according to the accumulation method includes a current accumulation method in which current is measured and current is accumulated per certain period of time, and a power accumulation method in which voltage and current are measured, then amounts of power are calculated by multiplying the measured voltage and current, and further amounts of power are accumulated per certain period of time. Both methods obtain discharge current amounts or discharge power amounts first, and then obtain the residual capacity of the secondary cell from the ratio of usable current amounts and power amounts of the cell. Therefore, it becomes possible to detect a stable residual capacity without depending on voltage fluctuations.

Further, a residual capacity detection method by combining the accumulation method and the voltage method may detect cell capacity more precisely. For example, if values are smaller than current values set in advance, the voltage method may be used, and if values are larger than the current values set in advance, the current accumulation method may be used. Ale selective use of each method to measure cell capacity enables highly precise computation of the cell capacity. Furthermore, the method in which a weighting addition of residual capacity rate detected by accumulation method and residual capacity rate detected by the voltage method is performed based on the residual capacity rate of the secondary cell to detect final residual capacity rate, is proposed. Any of the methods can be usable to embodiments of the invention.

Specifically, residual capacity (mAh), residual capacity rate (%), and remaining usable time (minute) are computed as residual capacity information. The residual capacity information is sent from the microcomputer 10 to an application equipment connected to the battery pack, such as microcomputer of camcorder via the I/O unit 15 and the communication terminal 4. The application equipment displays the received residual capacity information on LCD, or the like.

The microcomputer 10 includes a crystal resonator 18. A crystal oscillator having the crystal resonator 18 generates clocks which are a standard of operation timing of the microcomputer 10 as whole. The crystal oscillator generates clocks having high frequencies, such as 4 MHz and 8 MHz to operate the microcomputer 10 in the high-speed mode. When the crystal oscillator is operated, the microcomputer 10 captures voltage values, current values, and temperature data by A/D converter, communicates with external application equipments, computes the cell capacity, and judges the used state of the secondary cell (described later).

The microcomputer 10 has a built-in clock oscillator (not shown). A Clock generated by the oscillator has a relatively low frequency, such as 32 KHz to operate the microcomputer 10 in the low-speed mode. When the crystal oscillator is stopped and the built-in oscillator is operative, the microcomputer 10 is not communicating with external application equipments but waiting signals from the application equipments.

One of features of a lithium-ion cell used as the secondary cell 1 resides in lower self-discharge compared with self-discharge of other types of cells. Further, even if the battery pack is left, power thereof is consumed due to generation of standby power and current leak. However, the power consumption is largely suppressed by power-saving design (described later). Therefore, even if the battery pack is left for a long time, such as several months or one year, a drop in voltage does not occur so much. Accordingly, even if the battery pack is left at, for example, the full charged state, the high voltage state is kept until the battery pack is used next, and this leads to degradation of the battery pack. It is noted the left state is not limited to the state where the battery pack is removed from the application equipment, but includes a state where the battery pack is mounted to the application equipment which may be either in the used or unused state.

Power-saving design of the battery pack is described below Power consumption of the battery pack largely differs depending on the operation state of the microcomputer 10. For example, when a voltage value of the secondary cell 1 is 3.8V and the microcomputer 10 is at high-speed mode, consumption current of the battery pack is 1.2 mA, on the other hands, when the microcomputer 10 is at low-speed mode, consumption current is 0.097 mA. The consumption current is a total of all currents flowing in the battery pack. Therefore, when the microcomputer 10 constantly operates at high-speed mode and total capacity of the secondary cell 1 is 600 mAh, the total cell capacity in the battery pack is consumed after the passage of 500 hours (600 mAh/1.2 mAh=500).

Thus, the microcomputer 10 is adapted to operate at interval at high high-speed mode to suppress power consumption of the battery pack. Typically, the microcomputer 10 is required to operate at high-speed mode for short hours necessary for computation processing, or the like. Accordingly, the battery pack is designed to be changed to high-speed mode for minimum required hours, and then shift to low-speed mode immediately after end of the computation processing. Under the high-speed mode, processing, such as capture of measurement data, such as voltage values, current values, and temperature by A/D converter, computation of the residual capacity, judgment of used state/unused state (described later), and control of shift to degradation control mode are performed.

As shown in FIG. 2A, a time period of 15 msec in one cycle of three seconds is set to be a high-speed mode, and other time periods are set to be a low-speed mode, and under the condition, average consumption current is around 0.1 mAh. On the other hand, if the microcomputer 10 is adapted to continuously operate at high-speed mode, the consumption current is 1.2 mA. Thus, average power can be suppressed to around one-twelfth by the pulse operations described above. Hereinafter, a mode in which a high-speed mode of a first time period and a low-speed mode of a second time period being shorter than the first time period are repeated alternatively is referred as a normal mode. The microcomputer 10 operates at normal mode even when the battery pack is not mounted to the application equipment.

In an embodiment, a degradation control mode as a second operation state having a larger power consumption compared with that of the normal mode as the first operation state is used, and either one of the first operation state and the second operation state is selectable. As shown in a short dashed line in FIG. 2B, an example of the degradation control mode is a mode in which the microcomputer 10 continuously operates at the high-speed mode. According to an embodiment, the degradation control mode in which consumption current, such as 1.5 mA being larger than consumption current of the high-speed mode (1.2 mA) continuously flows is settable, as shown in FIG. 2B. Processing to increase the number of capturing of data by A/D converter, processing to increase the numbers of access to the EEPROM 14, and the like are not required in the normal mode, but by performing the processing, larger consumption currents compared with that of the high-speed mode can be flown.

The degradation control mode is activated when the battery pack is left longer than a predetermined time period at a relatively high voltage. Consequently, the voltage of the secondary cell 1 is lowered smoothly and the secondary cell 1 is prevented from being left for long hours under high voltage state.

If, after activation of degradation control mode, either a battery pack is judged as being in the used state or the voltage of the secondary cell 1 becomes equal to or below predetermined voltage value, the mode is shifted from the degradation control mode to the normal mode again to prevent the battery pack from becoming overdischarge state. By switching operation modes of a battery pack based on the used state and voltage state of the battery pack, voltage of the secondary cell 1 can be adjusted to a voltage state suitable for the keeping of the cell in storage.

Whether the battery pack is in the used state or unused state is judged by values of currents flowing in the battery pack and the communication state between the battery pack and an external application equipment. Processing of judging used state of the battery pack made by the microcomputer 10 will be described by referring to FIG. 3.

At first, under the standby mode of the battery pack, whether current measured by the current measuring unit 11 is equal to or below current threshold value (for example, ±10 mA) or not is judged (step S1). If the current is not equal to or below ±10 mA, in other words, if the absolute value of charging current or discharging current is larger than 10 mA, the cell is judged as in the used state, and in step S4, cell flag of one hit indicates "0" (representing a used state).

If the measured current is equal to or below current threshold value (for example ±10 mA) in step S1, whether communication is interrupted or not is judged in step S2. The communication interruption judgment depends on whether level of the communication terminal 4 is switched between high and low at predetermined cycles. When the communication is interrupted, the cell flag indicates "0" and judged as in the used state (step S4), and when communication is not interrupted, the cell flag indicates "1" (representing an unused state).

The judgment processing as to whether the battery pack is in the used state or not is repeated at predetermined cycles, such as one time per three seconds. Power consumption of the battery pack may be lowered by reducing the frequency of judgment made to detect whether the cell is in the used state. The used state judgment is made by the microcomputer 10 at high-speed mode. Therefore, even when the battery pack is left, the used state can be constantly checked.

Figure 4:
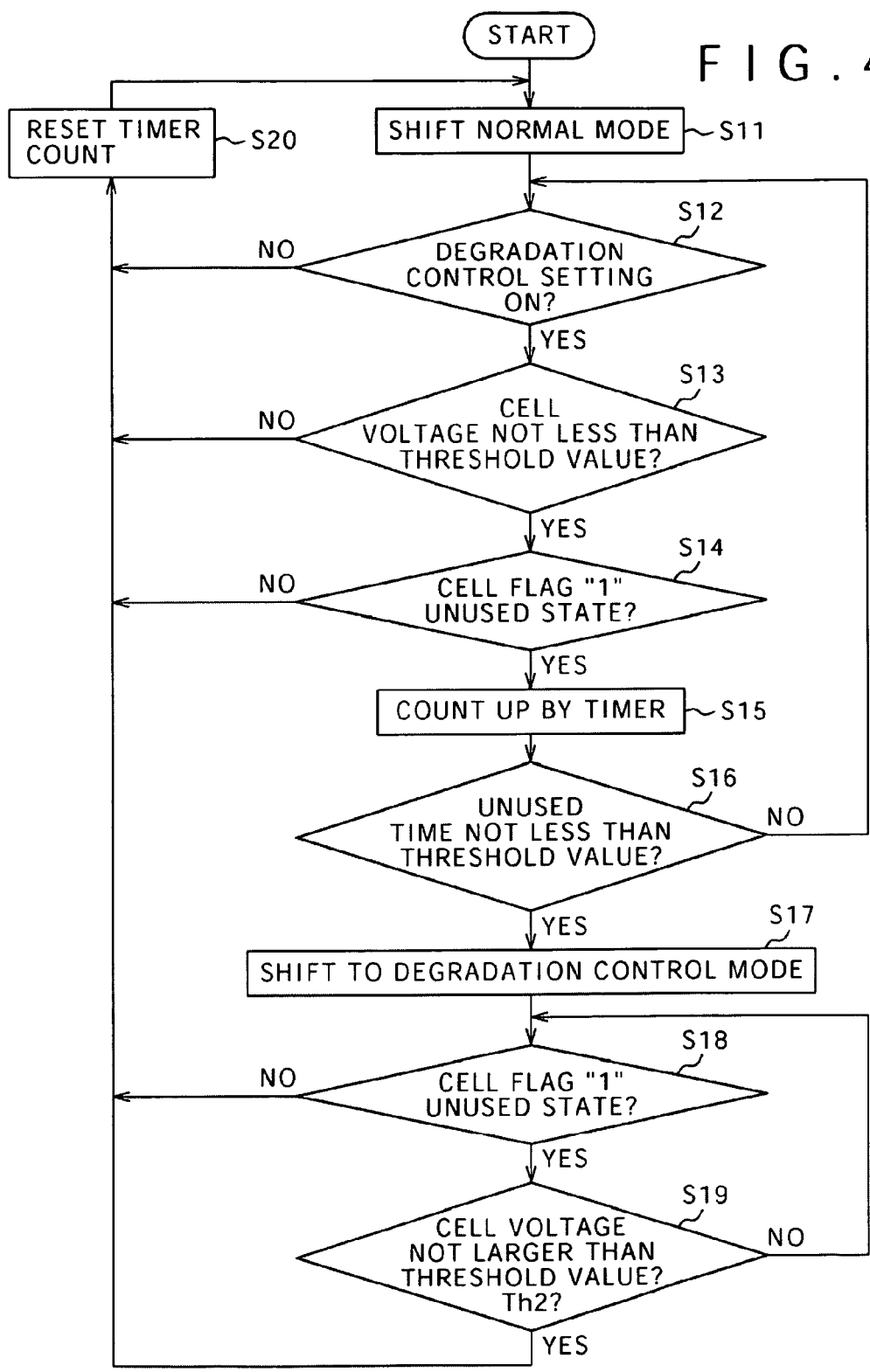
FIG. 4 is a flowchart showing the processing according to an embodiment.

Details of processing flows in an embodiment of the present invention will be described by referring to flow chart of FIG. 4. The judgment processing as to whether the battery pack is in the used state or not (FIG. 3) is repeated at predetermined cycles, such as one time per three seconds, and processings shown in flow chart of FIG. 4 are also repeated at the same cycle. First, in step S11, the microcomputer 10 operates in a normal mode. Under the normal mode, the microcomputer 10 operates at predetermined frequency, such as one time per three seconds and shifts from low-speed mode to high-speed mode like a pulse. Accordingly, the power consumption of the battery pack may be suppressed.

Next, in step S12, judgment is made as to whether degradation control setting is ON or not. ON or OFF of the degradation control setting is controllable by a user through button operations of an external equipment. For example, if degradation control setting is ON state, even if a user does not use the equipment for a long time, the degradation of the battery pack caused by leaving the secondary cell 1 for a long time in a high voltage state can be suppressed. Constant shift to degradation control mode without user setting is possible.

When the degradation control setting is OFF state, timer count for measuring the elapsed unused time period (described later) is reset (step S20), and the operation in the normal mode continues. On the other hand, when the degradation control setting is ON state, whether voltage of the secondary cell 1 measured by the voltage measuring unit 12 is not less than threshold value Th1 (for example, 4.0V) is judged in step S13. The threshold value Th1 is set to a value at which the degradation is caused in the case of being left at not less than the threshold value.

Processing proceeds to step S20, and count of timer is reset if voltage of the secondary cell 1 is smaller than the threshold value Th1. When voltage of the secondary cell 1 is not less than the threshold value Th1, whether cell flag indicate "1" (unused state) is judged, and if the cell flag indicates "0", that means the battery pack is in the used state, and therefore processing proceeds to step S20 to reset timer count.

Figure 5:
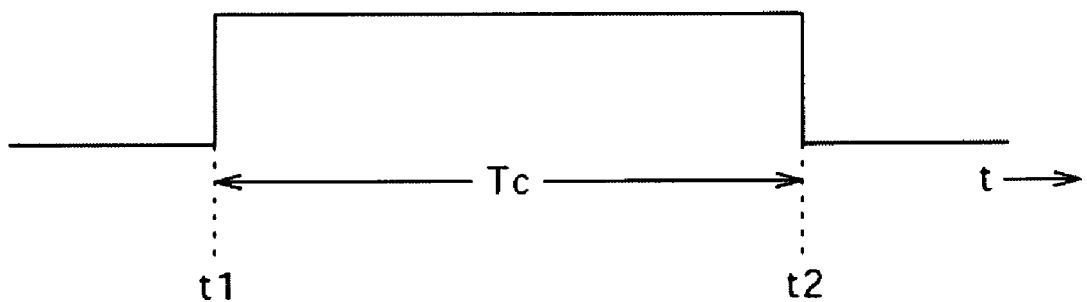
FIG. 5 is a simplified linear drawing for describing operation of timer count according to an embodiment.

When the cell flag indicates "1", count value of timer for measuring the elapsed lime period in which the cell voltage is not less than the threshold value Th1 and in the unused state (hereinafter referred as "unused time period" as appropriate) is added by one. The count value of the timer is added each time processing comes to step S14. Count operation continues from t1 to t2 as shown in FIG. 5. In the figure, t1 indicates start of count operation and t2 indicates timing when timer count is reset in step S20. During Tc indicating the time period count operation is performed and during that time period, count value increases.

Then, in step S16, whether the unused time period Tc measured by timer is not less than a predetermined threshold value (for example, fourteen days) is judged, and this judgment is made by comparing count value of timer with predetermined threshold value. When the unused time period is shorter than the predetermined threshold value, processing returns to step S12 to repeat processings of step S12 to S16 again.

When the unused time period is not less than the predetermined threshold value, the battery pack is judged to be left in high voltage state for a predetermined time period, and in step S17, the normal mode is shifted to the degradation control mode. The threshold value for judging a time period may be set arbitrarily. Further, the threshold value may be changed depending on temperature measured by the temperature measuring unit 13. For example, under high temperature, the degradation speed becomes fast, and thus the threshold value is set to be short.

As described by referring to FIG. 2B, since degradation mode is operation state having a larger power consumption compared with that of the normal mode, the degradation mode can lower voltage of the secondary cell 1 quickly compared with the normal mode. Accordingly, the secondary cell 1 may be prevented from being kept at high voltage state for a long time.

Under the degradation control mode, whether the cell flag indicates "1" (unused state) is judged in step S18. If the cell flag is judged as indicating "0" (used state), timer count is reset (step S20), and if the cell flag is judged as indicating "1", judgment as to whether voltage of the secondary cell 1 measured by the voltage measuring unit 12 is equal to or less than threshold value Th2 (for example, 3.3V) is made in step S19. When the cell voltage becomes equal to or less than the threshold value Th2, the threshold value Th2 is set to voltage in which the secondary cell 1 becomes overdischarge state.

In case voltage of the secondary cell 1 is smaller than the threshold value Th2, timer count is reset (step S20) to prevent the secondary cell 1 from becoming overdischarge state. If voltage of the secondary cell 1 is equal to or larger than the threshold value Th2, the degradation control mode continues. Thus, the secondary cell 1 is prevented from being left under a high voltage state for a long time and becoming overdischarge state, whereby the degradation of the battery pack may be suppressed.

Typically, the battery pack is suitable for keeping when residual capacity is in the range of 20% to 50% of total capacity of the secondary cell 1. Therefore, if the voltage threshold value Th1 is set to be voltage value at which residual capacity of the secondary cell 1 is, for example, 50% of total capacity and if the voltage threshold value Th2 is set to be voltage value at which residual capacity of the secondary cell 1 is, for example, 20% of total capacity, the residual capacity of the secondary cell 1 may be kept in the range of 20% to 50% of the total capacity.

In this manner, according to an embodiment, when the battery pack is judged as not used for a long time, the normal mode of the microcomputer 10 is shifted to the degradation control mode, and whereby the voltage of the secondary cell 1 can be lowered without adding new devices, such as circuits for discharging. Further, under the degradation control mode, if the battery pack becomes the used state or if voltage of the secondary cell 1 becomes equal to or less than the predetermined voltage threshold value Th2, the degradation control mode is shifted to the normal mode. Accordingly, the voltage of the secondary cell 1 is automatically adjusted and residual capacity of the secondary cell 1 may be kept at conditions suitable for keeping the cell, such as (residual) capacity range from 20% to 50% of total capacity of the secondary cell 1. Thus, regardless of carelessness of a user and used state of the battery pack, even if the battery pack is unused for a long time, the performance degradation of the battery pack may be suppressed.

According to an embodiment, a battery pack shifts to an operation state with a large power consumption when an unused time period of the battery pack elapsed equal to or longer than a predetermined time period, thus it is possible to prevent the secondary cell from being left at high voltage state for a long time. Accordingly, it is possible to prevent the secondary cell from being further degraded even if the battery pack is left for a long time without depending on use method and used condition by a user.

An embodiment has been described in details, but the present application is not limited to the embodiment, and various modifications are possible based on technical idea of the present invention. For example, numeral values, such as voltage value used in the embodiment are just samples, and different numeral values may be used where necessary.

Further, the present invention may be applied to a secondary cell (assembled cells) where a plurality of cells are connected in series, in parallel, or in serial parallel. In this case, judgment of used state/unused state, and control of shift between the normal mode and the degradation control mode are performed with respect to assembled cells, but voltage comparison between the threshold value Th1 and Th2 may be made for a predetermined battery cell in a assembled cells. Further, present invention is applicable to various kinds of cells, such as Ni—Cd cells and Ni-MH cells in addition to lithium-ion cells.

Further, a microcomputer included in a battery pack may function as a protection circuit. Furthermore, the voltage adjustment of the secondary cell may be performed by circuit configuration other than a microcomputer. If a microcomputer is used, voltage can be lowered by operation of the microcomputer under the degradation control mode, therefore the microcomputer has an advantage in that no special circuit for discharging is required.

Further, measurement of the unused time period of the battery pack may be performed by circuit configuration other than timer built in a microcomputer. However, there is an advantage that usage of a microcomputer does not require dedicated time measuring circuit.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery pack comprising:
a secondary cell;
a selection unit for selecting either a first operation state having a first power consumption or a second operation state having a second power consumption larger than the first power consumption;
a judging unit for judging whether the secondary cell is in a used state or an unused state;
an elapsed time period comparing unit for comparing an elapsed time period with a predetermined time period, the elapsed time period being a time period over which a voltage of the secondary cell is not less than a first voltage threshold value and the secondary cell is in the unused state; and
a control unit for controlling the selection unit based on a comparison output from the elapsed time period comparing unit,
wherein the control unit controls the selection unit to switch from the first operation state to the second operation state when the elapsed time period is longer than the predetermined time period, and
the control unit controls the selection unit to switch from the second operation state to the first operation state either (a) when judged as being in the used state by the judging unit while the second operation is selected, or (b) when the voltage of the secondary cell becomes equal to or less than a second voltage threshold value which is smaller than the first voltage threshold value while the second operation state is selected.

2. The battery pack according to claim 1, wherein the judging unit judges that the secondary cell is in the unused state when either a charging current or a discharging current is equal to or less than the predetermined current threshold value.

3. The battery pack according to claim 1, wherein:
the control unit is capable of performing a data communication with an external equipment, and
the judging unit judges a state of not performing the data communication to be the unused state.

4. The battery pack according to claim 1, further comprising:
a temperature measuring unit for measuring a temperature of the secondary cell, and
wherein the predetermined time period varies based on the measured temperature.

5. The battery pack according to claim 1, wherein:
the control unit is composed of a processor,
the control with is capable of switching between a high-speed mode where the processor operates by clock of high frequency and a low-speed mode where the processor operates by clock of low frequency, and is capable of setting (a) a normal mode in which the high-speed mode of a first time period and the low-speed mode of a second time period is performed alternately, the second time period being longer than the first time period, and
(b) a degradation control mode in which the high-speed mode continues, and
wherein the first operation state is either the low-speed mode or the normal mode, and the second operation state is the degradation control mode.

6. The battery pack according to claim 5, wherein, in the degradation control mode, an amount of data processing of the processor is increased compared to an amount of data processing in the high-speed mode so that a consumption current larger than a consumption current in the high-speed mode is fed.

7. The battery pack according to claim 1, wherein the first voltage threshold value is set to a value at which degradation is caused if the secondary cell is left at a predetermined voltage value or above.

8. The battery pack according to claim 1, wherein the second voltage threshold value is set to be a voltage at which the secondary cell becomes at an overdischarge state.

9. The battery pack according to claim 1, wherein:
the first voltage threshold value is set to be a voltage value at which a residual capacity of the secondary cell becomes 50% of total capacity, and
the second voltage threshold value is set to be a voltage value at which the residual capacity of the secondary cell becomes 20% of the total capacity.

* * * * *